United States Patent [19]

Disanto et al.

[11] Patent Number: 5,402,145
[45] Date of Patent: Mar. 28, 1995

[54] ELECTROPHORETIC DISPLAY PANEL WITH ARC DRIVEN INDIVIDUAL PIXELS

[75] Inventors: Frank J. Disanto, North Hills; Denis A. Krusos, Lloyd Harbor, both of N.Y.

[73] Assignee: Copytele, Inc., Huntington Station, N.Y.

[21] Appl. No.: 18,111

[22] Filed: Feb. 17, 1993

[51] Int. Cl.$^6$ .............................................. G09G 3/28
[52] U.S. Cl. ................................. 345/107; 313/484; 359/296
[58] Field of Search ............... 340/787, 788, 763, 771; 313/483, 484, 358, 585, ; 359/293, 294, 295, 296, 297; 345/107, 48, 60, 49

[56] References Cited

U.S. PATENT DOCUMENTS

| | | | |
|---|---|---|---|
| 3,904,915 | 9/1975 | Hinson | 340/771 |
| 4,583,087 | 4/1986 | van de Venne | 345/105 |
| 4,956,577 | 9/1990 | Parker | 313/484 |
| 5,077,553 | 12/1991 | Buzak | 340/771 |
| 5,223,115 | 1/1993 | DiSanto et al. | 340/787 |
| 5,223,823 | 1/1993 | Disanto et al. | 340/878 |

FOREIGN PATENT DOCUMENTS

| | | | |
|---|---|---|---|
| 0023262 | 2/1977 | Japan | 313/484 |
| 1114828 | 5/1989 | Japan | 345/107 |
| 2284127 | 11/1990 | Japan | 345/107 |
| 3096925 | 4/1991 | Japan | 345/107 |
| 4212990 | 8/1992 | Japan | 345/107 |
| 2020060 | 11/1992 | WIPO | 345/107 |

Primary Examiner—Richard Hjerpe
Assistant Examiner—Lun-Yi Lao
Attorney, Agent, or Firm—Arthur L. Plevy

[57] ABSTRACT

An electrophoretic display includes a laminated triple pane construction with an electrophoretic fluid-containing envelope formed between the first and second panes and an ionizable gas-containing envelope between the second and third panes. A transparent reference electrode coats the first pane internal to the fluid envelope. A matrix of discrete pixels are disposed upon the second pane within the fluid envelope. Each pixel has a probe extending therefrom through the second pane and into the gas envelope. A plurality of row electrodes are disposed upon the second pane in the gas envelope in close proximity to corresponding rows of probes. A plurality of column electrodes disposed upon the third pane within the gas envelope perpendicular to the row lines establishes an addressable X-Y matrix. By impressing a sufficient voltage differential at selected intersections of the matrix, a local ionization of gas biases a proximate probe to the ionization potential. The probe potential is shared by the corresponding pixel, setting up an electrostatic field relative to the reference electrode for controlling the movement of pigment within the fluid. A capacitive effect is realized upon removal of ionization potential whereupon the gas deionizes leaving the pixel and probe to discharge slowly through the dielectric fluid.

17 Claims, 3 Drawing Sheets

ELECTROPHORETIC DISPLAY PANEL WITH ARC DRIVEN INDIVIDUAL PIXELS

FIELD OF THE INVENTION

The present invention relates to an electrophoretic display panel apparatus and, more particularly, to an electrophoretic display having independent pixel elements driven by an arc through an ionizable gas.

BACKGROUND OF THE INVENTION

Electrophoretic displays (EPIDS) are now well known. A variety of display types and features are taught in several patents issued in the names of the inventors herein, Frank J. DiSanto and Denis A. Krusos and assigned to the assignee herein, Copytele, Inc. of Huntington Station, N.Y. For example, U.S. Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. No. 4,742,345, entitled ELECTROPHORETIC DISPLAY PANELS AND METHODS THEREFOR, describes a display having improved alignment and contrast. Many other patents regarding such displays are also assigned to Copytele, Inc.

The display panels shown in the above-mentioned patents operate upon the same basic principle, viz., if a suspension of electrically charged pigment particles in a dielectric fluid is subjected to an applied electrostatic field, the pigment particles will migrate through the fluid in response, to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the polarity and direction of the electrostatic field and the charge on the pigment particles. The electrophoretic display apparatus taught in the foregoing U.S. Patents are "triode-type" displays having a plurality of independent, parallel, cathode row conductor elements or "lines" deposited in the horizontal on one surface of a glass viewing screen. A layer of insulating photoresist material deposited over the cathode elements and photoetched down to the cathode elements to yield a plurality of insulator strips positioned at right angles to the cathode elements, forms the substrate for a plurality of independent, parallel column or grid conductor elements or "lines" running in the vertical direction. A glass cap member forms a fluid-tight seal with the viewing window along the cap's peripheral edge for containing the fluid suspension and also; acts as a substrate for an anode plate deposited on the interior flat surface of the cap. When the cap is in place, the anode surface is in spaced parallel relation to both the cathode elements and the grid elements. Given a specific particulate suspension, the sign of the electrostatic charge which will attract and repel the pigment particles will be known. The cathode-element voltage, the anode voltage, and the grid element voltage can then be ascertained such that when a particular voltage is applied to the cathode and another voltage is applied to the grid, the area proximate their intersection will assume a net charge :sufficient to attract or repel pigment particles in suspension in the dielectric fluid. Since numerous cathode and grid lines are employed, there are numerous discrete intersection points which can be controlled by varying the voltage on the cathode and grid elements to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of pigment particles. The bit may be erased, e.g., upon a reversal of polarity and a logical zero-zero state occurring at the intersection coordinated with an erase voltage gradient between anode and cathode. In this manner, digitized data can be displayed on the electrophoretic display.

Besides the triode-type display, the applicant's herein have proposed a variety of EPID structures for utilizing the electrophoretic effect. For example, an alternative EPID construction is described in application Ser. No. 07/345,825, now U.S. Pat. No. 5,053,763, entitled DUAL ANODE FLAT PANEL-ELECTROPHORETIC DISPLAY APPARATUS, which relates to an electrophoretic display in which the cathode/grid matrix as found in triode-type displays is overlayed by a plurality of independent, separately addressable "local" anode lines. The local anode lines are deposited upon and aligned with the grid lines and are insulated therefrom by interstitial lines of photoresist. The local anode lines are in addition to the "remote" anode, which is the layer deposited upon the anode faceplate or cap as in triode displays. The dual anode structure aforesaid provides enhanced operation by eliminating unwanted variations in display brightness between frames, increasing the speed of the display and decreasing the anode voltage required during Write and Hold cycles, all as explained therein.

In general, it can be noted that a variety of EPID configurations have been proposed by the prior art. In the quest for better EPID's, improvements in resolution, speed of operation, simplicity of construction, reliability and economy continue to be sought.

An object of the present invention is to achieve an improved EPID structure and function.

SUMMARY OF THE INVENTION

The problems and disadvantages associated with conventional electrophoretic displays are overcome by the present invention which includes a first receptacle containing electrophoretic fluid and a second receptacle containing an ionizable gas. The first and second receptacles share a common barrier wall and a plurality of conductive pathways penetrate the barrier wall. A first end of the conductive pathways is disposed proximate the fluid while a second end is in contact with the gas. Apparatus is provided for ionizing the gas proximate selected conductive pathways to bias those selected pathways in order to induce movement of pigment in the fluid proximate the first end of the selected conductive pathways.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
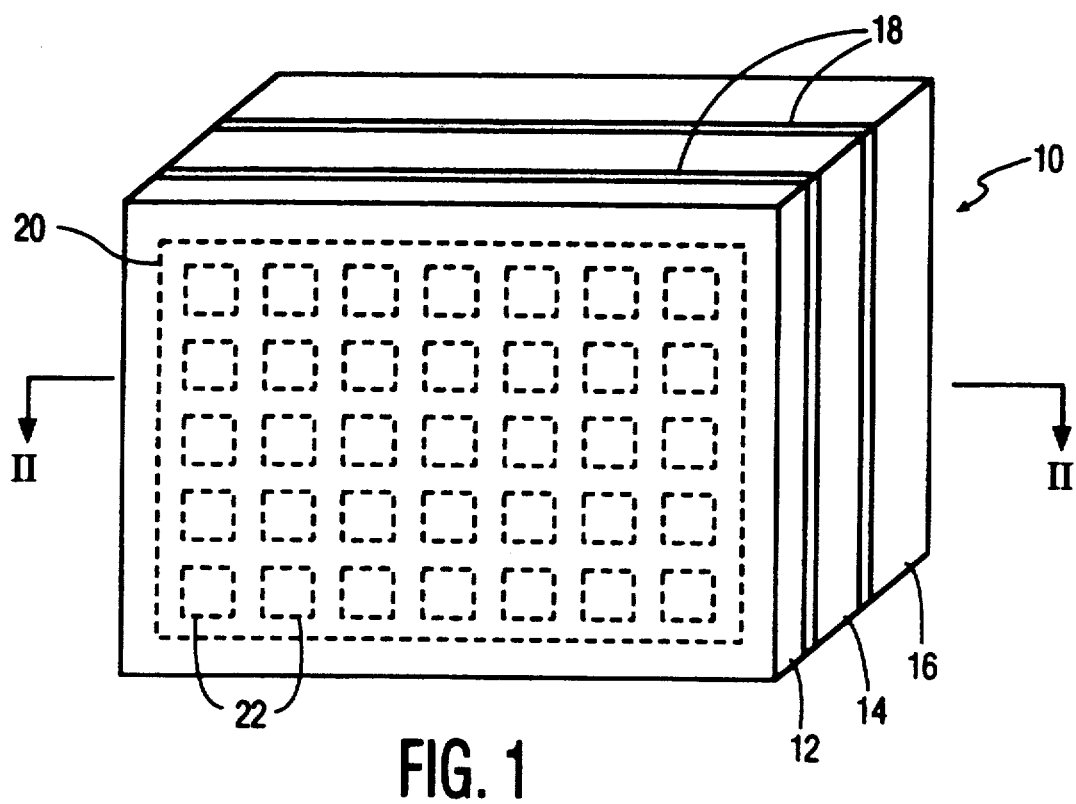
FIG. 1 is a perspective view of an electrophoretic display in accordance with an exemplary embodiment of the present invention.

FIG. 1 shows an electrophoretic display or EPID 10 having a front faceplate 12, an intermediate pixel carrier plate 14 and a backplate 16. Typically, the plates 12, 14 and 16 would be formed from glass due to its transparency, dielectric strength and compatibility with photoetching processes. The plates are separated by spacers 18 which join the respective plates about their periphery forming a pair separate internal envelopes or receptacles, a first for containing electrophoretic fluid and a second for containing an ionizable gas, as shall be seen and described more fully below. The spacers are typically mylar and are bonded to the respective plates making up the EPID 10 by epoxy which flows under the influence of pressure and heat and upon cooling bonds to form an airtight and fluid tight seal. The faceplate of the EPID 10 has a substantially clear indium-tin-oxide (ITO) electrode 20 deposited on the interior surface thereof through which the electrophoretic effect may be visualized, A plurality of individual pixels 22 disposed on the intermediate pixel carrier plate 14 are depicted in dashed lines. Like the faceplate electrode 20, the individual pixels 22 may be formed of indium-tin-oxide (ITO) and are electrically conductive. In the alternative, metals such as chrome could be employed. Methods for depositing and shaping indium-tin-oxide on glass substrates are known in the art and are described, e.g., in the above-referenced U.S. Pat. Nos. 4,655,897 and 4,732,830.

Figure 2:
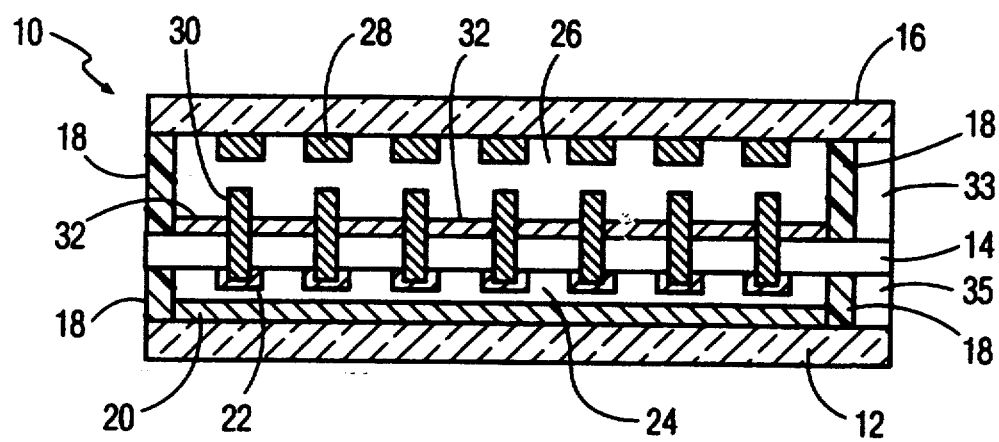
FIG. 2 is an enlarged cross-sectional view of the EPID shown in FIG. 1 taken along section line II—II and looking in the direction of the arrows.

FIG. 2 illustrates the interior components of the EPID 10. An anterior sealed chamber 24 receives electrophoretic fluid which includes a dielectric fluid and suspended therein a dispersion of colloidal surface-charged pigment particles, as is known in the art. Examples of typical electrophoretic fluids are referred to in U.S. Pat. Nos. 4,655,897 and 4,732,830. One such typical fluid employs a dark blue or black dielectric along with yellow negatively surface-charged pigment particles. A posterior chamber 26 formed by the sealing of mylar seals 18 to plates 14 and 16 contains an ionizable gas such as Argon, Xenon or Neon or a mixture of such gases. The rear plate 16 supports a plurality of parallel column conductor lines 28 disposed in this view in the "vertical direction". The conductor lines 28 may be formed from ITO, chrome or any other conductor material in a manner which is conventional in the art, such as photoetching, plasma etching, etc. The individual pixel elements 22 disposed upon the intermediate pixel carrier plate 14 are electrically connected to associated conductor pins 30 formed from copper or any other suitable conductor. The conductor pins 30 penetrate the intermediate pixel carrier plate 14 such that a portion protrudes toward the backplate 16 within the posterior chamber 26 and a portion protrudes toward the interior chamber to establish contact with an associated individual pixel 22. If the vertical conductor members or column lines 28 are arbitrarily described as "vertical", the individual pixels may be said to be horizontally grouped in rows which are disposed at right angles to the vertical conductor lines 28. The grouping of the individual pixels 22 and associated conductor pins 30 is established by row conductor lines 32 which traverse the intermediate pixel carrier plate 14 proximate to but not in conductive association with the conductor pins 30. Preferably, a row conductor line 32 is disposed on either side of a set or row of conductor pins 30 as shall be seen more conveniently in FIG. 3. A pair of driver circuits 33, 35 for driving the respective electrodes 20, 28 and 32 are shown diagrammatically and are such as are known in the art as, e.g., represented by the teachings of U.S. Pat. Nos. 4,655,897 and 4,732,830.

Figure 3:
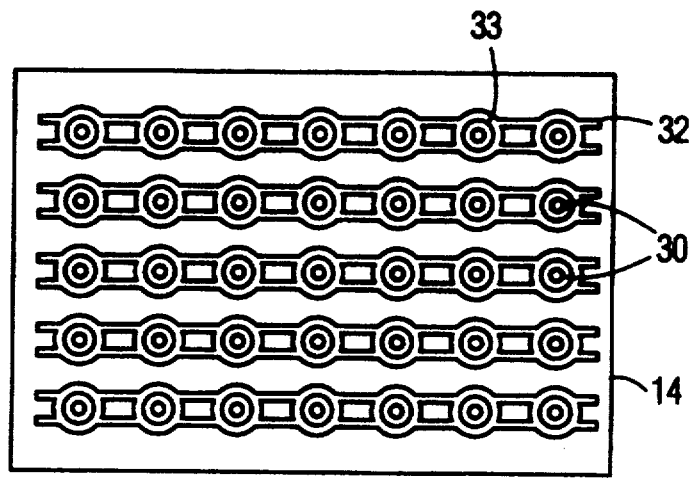
FIG. 3 is a rear elevational view of the intermediate pixel carrier plate of the EPID shown in FIGS. 1 and 2.

FIG. 3 shows the rear portion of the intermediate pixel carrier plate 14 with the conductor pins 30 penetrating the plate and projecting towards the viewer. The conductor pins 30 are organized into rows by pairs of row conductor lines 32 which traverse the intermediate pixel carrier plate 14 proximate to but not touching the conductor pins 30. In order to provide a uniform electrostatic field proximate the individual conductor pins 30, each of a pair of the row conductor lines assumes a semicircular shape proximate thereto which semicircles are conjoined to encircle the pins 30 and coaxial spacing 33.

Figure 4:
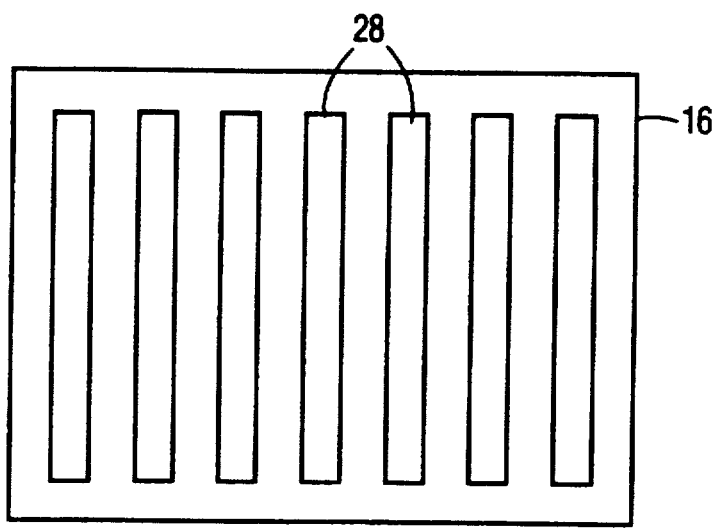
FIG. 4 is a front elevational view of the column conductor carrier plate of the EPID shown in FIGS. 1 and 2.

FIG. 4 shows the front portion of backplate 16 upon which is disposed a plurality of vertical conductor lines 28. As can be seen by referring to FIGS. 2, 3 and 4, the vertical conductor lines 28 align with individual pixel members 22 and corresponding conductor pins 30 thereby forming a matrix with the horizontal row conductor lines 32. The conductor pins 30 are disposed at each intersection of the matrix. In this respect, an X, Y addressable matrix is formed with the individual pixels 22 disposed at the addressable points on the matrix.

Figure 5:
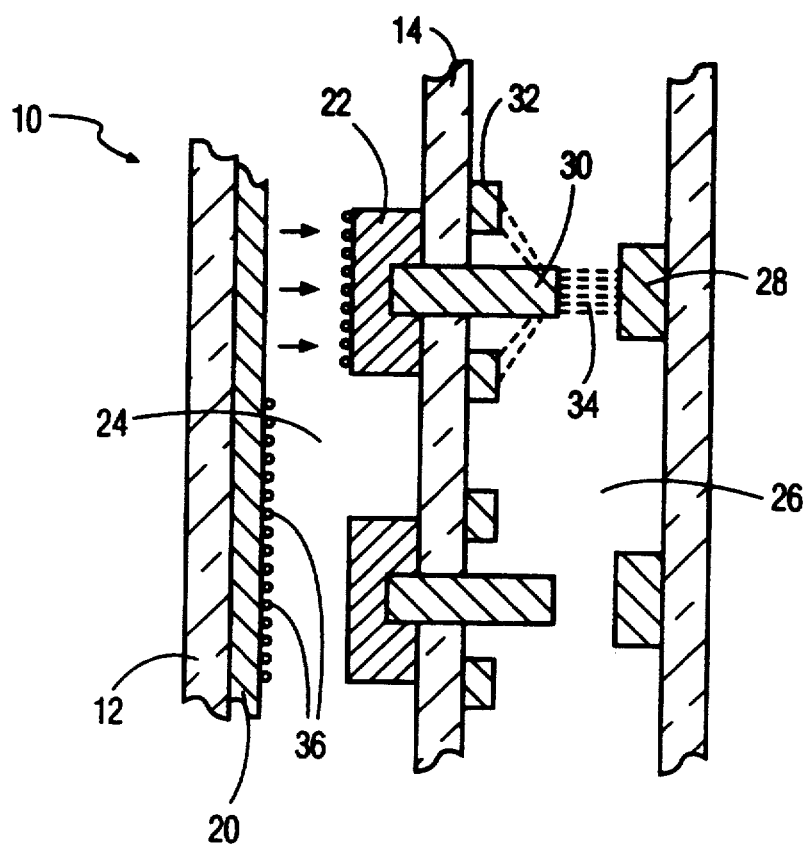
FIG. 5 is an enlarged diagrammatic view of a fragment of the EPID shown in FIG. 2 illustrating operation.

FIG. 5 shows an enlarged fragment of the display 10 shown in FIG. 2 with one of the conductor pins 30 supporting an electric arc 34 traversing the gap between itself and an associated vertical conductor line 28. The electric arc is supported by the local ionization of the gas filling the posterior chamber 26 and originates from row conductor line 32. Given a voltage drop between a particular row conductor line 32 and an intersecting vertical conductor line 28 which is equal to or greater than the threshold voltage to create ionization across a particular physical gap, an electric discharge will occur as illustrated by electric arc 34. The threshold voltage is dependent upon the gas and the size of the gap. Since the conductor pin 30 is interposed into the arc pathway from the row conductor lines 32 to the vertical conductor column lines 28, the conductor pin 30 is raised to a voltage level corresponding to that of the electric are 34 at the point where the arc enters the conductor pin 30. Given that the conductor pin 30 is in electrical continuity with a single pixel 22, the potential of pixel 22 is also raised or lowered to the voltage of the conductor pin. In this manner, the pigment particles can be controlled, that is by setting the voltage of the individual pixels 22 in accordance with the voltage level of the electric arc 26. In FIG. 5, the electric are is induced by a positive voltage gradient from the row conductor line 32 to the vertical conductor line 28 such that the conductor pin 30 is raised to a high positive voltage thereby attracting the pigment particles 36 towards the individual pixel 22. This can be described as writing the pixel. The remainder of the pigment particles 36 are retained on the faceplate electrode 20 by a zero or slightly positive voltage in areas adjacent to pixels 22 not influenced by the electric arc. It should be recalled that the anterior chamber 24 contains electrophoretic fluid which is a dielectric fluid suspending pigment particles 36 therein. In accordance with the operation of electrophoretic displays, the concentration of pigment particles proximate to or distal to the faceplate 12 is responsible for the display characteristics, namely if yellow pigment particles 36 are adhered to the faceplate electrode 20, the resultant image will appear yellow in all areas with pigment particles 36 so adhered. In areas where the pigment particles are removed, that is, towards the pixels 22, the background dielectric solution color, for example black, will be evidenced. Thus, a convention is usually established in describing the electrophoretic display operation wherein a written pixel is either the absence of pigment particles, that is, a black pixel upon a yellow background defined by the presence of pigment particles, or vice-versa. In the present example, we will use the convention that a written pixel will be black and that the pigment particles 36 are yellow and negatively charged. What has been described then is an apparatus for creating an electric arc at a selected intersection of row conductor lines 32 and vertical conductor lines 28 to thereby influence pigment particles in an electrophoretic fluid which are further controlled by a planar faceplate electrode 20. By way of further example and explanation, assume that $V_1$ volts is necessary to cause the gas between a conductor pin 30 and a vertical conductor line 28 to ionize and that $V_2$ is equal to $\frac{1}{2}V_1$. If all the row conductor lines 32 are set at $V_1$ volts, and all the vertical conductor members are set at $V_2$, the gas will not ionize at any intersection. If the horizontal row conductor lines 32 are sequentially placed at $V_1$ volts and the vertical conductor lines 28 are either left at $V_2$ or placed at 0 volts in accordance with a data pattern, then the gas between the electrodes which have a potential difference of $V_1$ volts will ionize. The conductor pins 30 which are in contact with the ionized gas will therefore be at a potential approximating $V_1$ and the charged pigment particles 36 will move in a direction consistent with the polarity of $V_1$ since the ITO of the faceplate electrode 20 is maintained close to zero potential. For example, if the row conductor lines 32 are sequentially placed at +100 volts and the vertical conductor lines 28 are maintained at +50 volts with a 100 volt differential required for ionization to occur, all vertical conductor lines which are placed at zero volts will then cause an ionization at that location. It should be appreciated that a negative voltage of, e.g., −100 volts imposed on row lines 32 would reach the ionization threshold at intersections with column lines 28 at 0 volts. This would result in the associated pixel at that intersection acquiring a potential approximating −100 volts thus repelling pigment particles to the faceplate electrodes 20 and thereby "erasing" the pixel. After each row of individual pixels 22 is written or erased, the gas is deionized setting up a capacitive effect between the individual pixels 22 and the faceplate electrode 20 since the pixels remain at the arc threshold voltage $V_1$ until discharged through the resistance of the electrophoretic fluid. The pixels 22, as capacitors, charge quickly through the low resistance of the ionized gas and discharge slowly through the high resistance of the electrophoretic fluid. If, for example, the pixels 22 are 0.0045 inches by 0.0045 inches and the space between the faceplate electrode 20 and the pixel 22 is approximately 0.0045 inches then the effective capacitance at each pixel is on the order of 8 microfarads. Thus, a current in the micro-amp range can easily charge the capacitor in 50 microseconds even to a voltage of 100 volts. The same capacitive pixel 22 will require many milliseconds to discharge because of the high resistance of the suspension. In this manner, a unique TFT arrangement can be achieved and the panel can be written at very fast rates approaching those of video. In accordance with an alternative embodiment, holes of approximately 0.0036 inches in diameter in the intermediate pixel carrier plate 14 could be employed instead of the conductor pins 30 which traverse the plate from the pixel to the gas envelope in the posterior chamber 26. The holes would form a matrix of individual gas discharge lamps. This configuration can readily be envisioned by simply removing the probes 30 shown in FIG. 5.

It should be understood that the embodiments described herein are merely exemplary and that a person skilled in the art may make many variations and modifications without departing from the spirit and scope of the invention as defined in the appended claims.

What is claimed is:

1. An electrophoretic display, comprising:
   a dielectric barrier wall having a first surface and an opposite second surface;
   a transparent faceplate disposed proximate said first surface of said barrier wall wherein said transparent faceplate and said first surface of said barrier wall define at least part of a fluid impermeable receptacle:
   a backplate disposed proximate said second surface of said barrier wall, wherein said backplate and said second surface of said barrier wall define at least part of a gas impermeable receptacle;
   an electrophoretic dispersion containing electrophoretic particles suspended in a suspension fluid, wherein said dispersion is contained within said fluid impermeable receptacle;
   an ionizable gas contained within said gas impermeable receptacle;
   a plurality of conductive elements extending through said barrier wall from said first surface to said second surface, wherein each of said conductive elements are insulated from each other and each of said conductive elements communicates with said electrophoretic dispersion and said ionizable gas;
   a first plurality of conductive pathways disposed on said second surface of said barrier wall;
   a second plurality of conductive pathways disposed on said backplate; and
   means for producing an arc through said ionizable gas, promote a selected one of said conductive elements, between one of said first plurality of conductive pathways and one of said second plurality of conductive pathways, wherein said arc applies an electrical bias to one of said conductive elements that traverses the barrier wall and creates an electrophoretic effect within said electrophoretic dispersion.

2. The device of claim 1, wherein said first plurality of conductive pathways includes a plurality of substantially parallel column conductor lines disposed on second surface of said barrier wall and said second plurality of conductive pathways include a plurality of row conductor lines disposed on said backplate in an orientation that is substantially perpendicular to said column conductor lines, thereby forming an addressable X-Y matrix.

3. The device of claim 2, further including a reference electrode disposed fin said faceplate, wherein said reference electrode is in contact with said electrophoretic dispersion and generally faces said first surface of said barrier wall.

4. The device of claim 3, further including means for applying a predetermined electrical bias to said reference electrode.

5. The device of claim 1, further including a plurality of discrete conductive pixels disposed upon said first surface of said barrier wall, wherein each of plurality of pixels is paired in electrically conductive association with a corresponding one of said plurality of conductive elements.

6. The device of claim 2, wherein each of said plurality of conductive elements is disposed on said second surface of said barrier wall at a position proximate a corresponding intersection of said X-Y matrix.

7. The device of claim 6, wherein said selected conductive pathways are biased through contact with an ionized portion of said gas.

8. The device of claim 1 wherein said faceplate is bonded to said barrier wall with a first insulating spacer that separates said faceplate from said barrier wall and defines said fluid impermeable receptacle.

9. The device of claim 8, wherein said backplate is bonded to said barrier wall with a second spacer that separates said backplate from said wall and defines said gas impermeable receptacle.

10. The device of claim 9, wherein said reference electrode is disposed upon said faceplate, plurality of column lines are disposed on said backplate and plurality of row lines are disposed upon said barrier wall.

11. The device of claim 1, wherein said faceplate, said backplate and said barrier wall are each substantially parallel, coextensive, plate-like members.

12. The device of claim 1, wherein, said backplate and said barrier wall are each substantially transparent.

13. The device of claim 1, wherein each of said plurality of conductive pathways is an elongated conductor member.

14. The device of claim 2, wherein said plurality of row conductor lines are grouped in pairs maintained at equivalent electrical potential relative each other and said conductive elements arranged in a plurality of rows, each between a corresponding pair of row conductor lines.

15. The device of claim 5, wherein said pixels, said first plurality of conductive pathways and said second plurality of conductive pathways are formed from indium tin oxide and are substantially transparent.

16. The device of claim 7, wherein said selected conductive pathways are biased by said ionized portion to a potential proportional to the dielectric strength of said gas.

17. The device of claim 12, wherein each of said plurality of conductive pathways is an aperture within said barrier wall communicating with said second receptacle.

* * * * *